(No Model.)
M. J. FITZGERALD.
TIRE TIGHTENER.
No. 492,667. Patented Feb. 28, 1893.
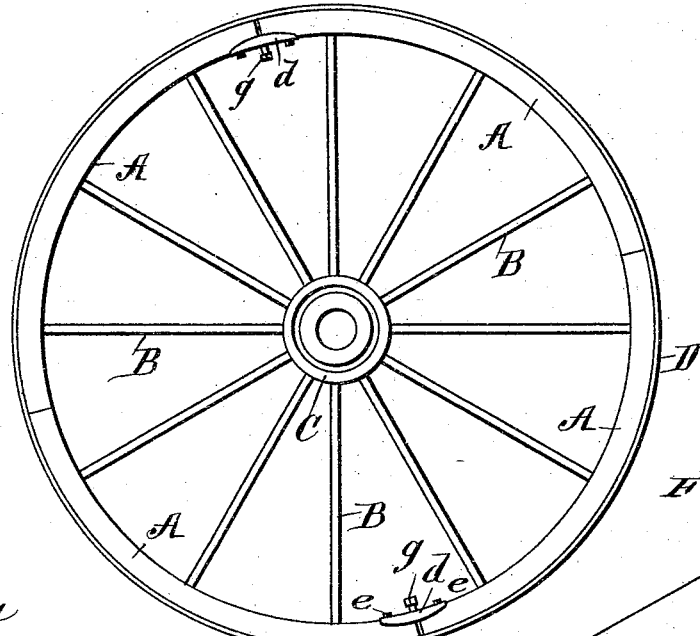
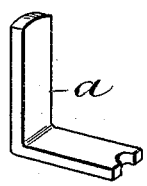
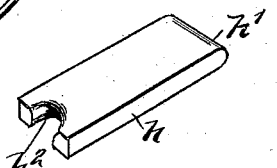
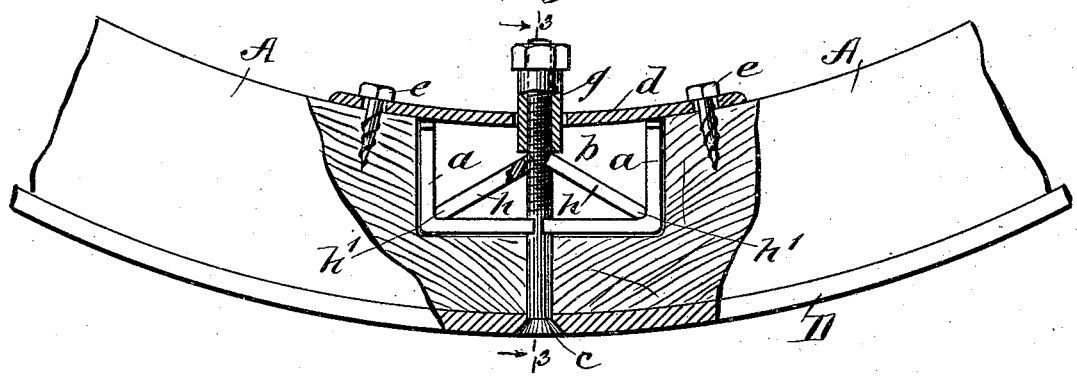
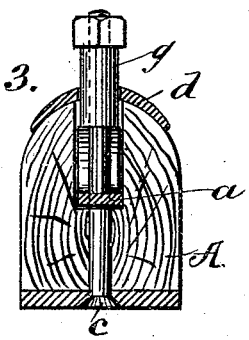
WITNESSES:
J. A. Bergstrom
C. Sedgwick
INVENTOR
M. J. Fitzgerald
BY Munn & Co
ATTORNEYS.

UNITED STATES PATENT OFFICE.

MICHAEL J. FITZGERALD, OF ARAVAIPA, ARIZONA TERRITORY.

TIRE-TIGHTENER.

SPECIFICATION forming part of Letters Patent No. 492,667, dated February 28, 1893.

Application filed November 7, 1892. Serial No. 451,161. (No model.)

*To all whom it may concern:*

Be it known that I, MICHAEL J. FITZGERALD, of Aravaipa, in the county of Graham and Territory of Arizona, have invented a new and useful Wagon-Tire Tightener, of which the following is a full, clear, and exact description.

The object of this invention is to provide a simple and inexpensive appliance for the wheels of draft wagons or carriages, which will afford means for reliably expanding the wheel rim, by spreading the felly joints and thereby tightening the contact of the fellies upon the tire at any time the latter becomes loose.

To this end, my invention consists in the construction and combination of parts, as is hereinafter described and claimed.

Reference is to be had to the accompanying drawings forming a part of this specification, in which similar letters of reference indicate corresponding parts in all the figures.

Figure 1 is a side view of a vehicle wheel having the improvement. Fig. 2 is an enlarged, broken and partly sectional view of a wheel rim and tire, showing the novel felly expanding device partly in section thereon. Fig. 3 is a transverse section on the line 3—3 in Fig. 2. Fig. 4 is a perspective view of a detached detail of construction; and Fig. 5 is a perspective view of another part of the improvement detached.

In the drawings, A represents the fellies of a vehicle wheel, B the spokes, C the hub, and D the tire, which may be of required dimensions to provide one of a set of wheels for a passenger conveyance, or a heavy draft wagon for freight. The improvement in duplicate is introduced oppositely at joints between adjacent ends of fellies, as shown in Fig. 1. As the pair of expanders are alike, the description of one will suffice to indicate the construction of both.

In Fig. 2, the parts of the novel device are shown assembled for service, and secured in place at the junction of two felly ends, consisting of two similar right angle plates $a$, that are located in the elongated rectangular and transversely central recess $b$, which is formed in the adjacent felly bodies, being excavated from the inner surface of the latter an equal extent from their rear terminals. Such a proportionate length, width and depth are provided for the recess $b$, as will allow the angle plates $a$ to rest upon its bottom surface, and have their vertical members lie against the upright end walls of the recess. A clamping bolt $c$ passes through aligning perforations in the tire D, and abutting ends of the fellies A, said bolt being provided with a conical head which is embedded in a countersink formation on the exterior portion of the tire.

The end portions of the angle plates $a$, that are near the joint between the felly ends, have scallops cut in them to permit the free insertion of the bolt $c$ between them, and the upper ends of the other limbs on the angle plates are rounded from edge to edge, so as to bear properly on the inner face of a cap-plate $d$. The piece $d$ is curved transversely and also longitudinally, to adapt it to fit the rounded and curved inner edge portions of the adjacent fellies A, whereon the plate is secured by the screw bolts $e$, that pass through slightly elongated holes in the plate near the ends and penetrate with their threaded bodies the fellies, as shown in Fig. 2. The cap-plate $d$ is perforated near its center of length and width for the free passage of the threaded end portion of the clamping bolt $c$, this hole in the cap-plate being of a diameter that will permit the reciprocation of a thimble nut $g$, therein, the latter named piece having a threaded engagement with the bolt; a hexagon formation on the outer portion of the nut affording means for adjusting it as may be required.

Two similar toggle bars $h$ are provided, which are essential portions of each expander, their shape being indicated in Fig. 5, and as shown, each consists of a flat bar having parallel edges, one end $h'$, being rounded from side to side, and square at the edges. At the other end of each toggle bar, a curved notch is cut, as at $h^2$, in Fig. 5, and the edges of these notches are rounded, so that when the bars are introduced within the recess $b$, and their ends $h'$ located in the right angle corners of the plates $a$, the notched ends $h^2$, will partly embrace the bolt body $c$; the relative length of the toggle bars causing them to lie in oppositely pitched inclined planes, as represented in Fig. 2.

It will be seen that when the parts of one of the duplicate felly expanders are assembled as has been described, a rotatable movement of the thimble nut $g$, which will cause it to move toward the bolt head, will produce a pressure upon the ends $h^2$ of the toggle bars $h$, and cause their depression, which movement will press the other ends $h'$, of the bars forcibly upon the engaged angle plates $a$, and spread them apart, correspondingly moving the fellies A.

The pair of felly expanders being diametrically opposite each other, it will be evident that a manipulation of the thimble nut $g$ of each of these devices of equal degree, will evenly spread the engaged fellies and increase the diameter of the wheel rim, forcing the fellies against the tire so as to tighten the connection between said piece and the wooden rim of the wheel.

When the improvement is applied to the wheels of a vehicle it will obviate the necessity of heating the tire to affix it in place by subsequent cooling and contraction, and also permit a removal and replacement of the tire, or substitution of a new tire without the employment of skilled labor to effect such an operation.

Having thus fully described my invention, I claim as new and desire to secure by Letters Patent—

1. A tire tightener, comprising angle plates in a recess between opposing felly ends, toggle bars bearing endwise on the angle plates and also on a central screw, and a nut for the screw adapted to press on the bar ends and spread the plates and fellies, substantially as described.

2. A tire tightener, comprising angle plates in a recess between opposing felly ends, a cap-plate for said recess, a clamping screw-bolt passing through the tire and said recess, a thimble nut on the inner end of said bolt, and toggle bars adapted to engage the angles of the plates with one end and be pressed upon by the thimble nut at their other ends, substantially as described.

3. In a tire tightener, the combination, with two adjoining fellies of a wheel, having recesses in their ends, a tire embracing the fellies, a cap-plate adapted to conform to the inner surface of the fellies and cover the recesses and perforated centrally and at its ends, and screw bolts loose in the end perforations in the cap-plate and fast in the fellies, of angle plates oppositely located in the recesses in the fellies at their adjacent ends, a clamping screw passing through the tire, fellies and cap-plate, a thimble nut on the threaded end of the clamping bolt and passing through the central aperture in the cap-plate, and oppositely inclined toggle-bars pressing at one end on the angle plates and pressed on at their other ends by the thimble nut, substantially as described.

MICHAEL J. FITZGERALD.

Witnesses:
HENRY T. FIRTH,
W. H. MOORE.